United States Patent
Eggleston et al.

[11] Patent Number: 5,853,022
[45] Date of Patent: Dec. 29, 1998

[54] VALVE ACTUATOR WITH INSTRUMENT MOUNTING MANIFOLD

[75] Inventors: Philip Wayne Eggleston, Sherman, Tex.; Steven Burl Paullus, Marshalltown, Iowa; Danny Paul Nelson, Marshalltown, Iowa; Kenneth Lemoyne Rasmussen, Marshalltown, Iowa; Randy Jerold Hall, Marshalltown, Iowa; Melvin Lew Osgood, Marshalltown, Iowa

[73] Assignee: Fisher Controls International, Inc., Clayton, Mo.

[21] Appl. No.: 629,898

[22] Filed: Apr. 10, 1996

[51] Int. Cl.⁶ .................................................. F16K 31/122
[52] U.S. Cl. ............................... 137/270; 251/62; 91/54; 92/59
[58] Field of Search .............................. 251/62, 63, 63.5, 251/63.6; 92/117 A, 59; 137/269, 270; 91/54

[56] References Cited

U.S. PATENT DOCUMENTS

| Re. 35,136 | 1/1996 | Hasegawa et al. . |
|---|---|---|
| 362,767 | 5/1887 | McNair . |
| 2,190,117 | 2/1940 | Griffith . |
| 2,293,269 | 8/1942 | Rufus . |
| 2,296,213 | 9/1942 | Kretzschmar . |
| 2,305,099 | 12/1942 | Morris . |
| 2,535,382 | 12/1950 | Bachli et al. . |
| 2,641,280 | 6/1953 | Fleischhauer . |
| 2,642,216 | 6/1953 | Carter . |
| 2,707,966 | 5/1955 | Taplin . |
| 2,722,881 | 11/1955 | Sutterfield et al. . |
| 2,731,534 | 1/1956 | Hansen et al. . |
| 2,870,873 | 1/1959 | Mueller . |
| 2,878,701 | 3/1959 | Weersma . |
| 3,011,758 | 12/1961 | McFarland, Jr. . |
| 3,070,029 | 12/1962 | Russell . |
| 3,082,792 | 3/1963 | Jenkins . |
| 3,084,901 | 4/1963 | Thorburn . |
| 3,175,472 | 3/1965 | Little . |
| 3,195,418 | 7/1965 | Zukas . |
| 3,224,345 | 12/1965 | Doetsch . |
| 3,254,660 | 6/1966 | Ray . |
| 3,275,286 | 9/1966 | Wood . |
| 3,282,171 | 11/1966 | Tuckmantel . |
| 3,434,395 | 3/1969 | Londal . |
| 3,452,961 | 7/1969 | Forsman . |

(List continued on next page.)

FOREIGN PATENT DOCUMENTS

| 0 192 973 | 9/1986 | European Pat. Off. . |
|---|---|---|
| 2 509 008 | 1/1983 | France . |
| 2 343 069 | 2/1975 | Germany . |
| 23 43 069 | 2/1975 | Germany . |
| 42 44 573 | 7/1994 | Germany . |
| 56-63164 | 5/1981 | Japan . |
| 1 595 576 | 7/1969 | United Kingdom . |

OTHER PUBLICATIONS

Fisher Controls, "Type 657 and 667 Diaphragm Actuators", Bulletin 61.1:657, Apr. 1992.

Fisher Controls, "470 Series Piston Actuators", Bulletin 61.2:470, Jul. 1993.

Fisher Controls, "Type 585 and 585R Piston Actuators", Bulletin 61.2:585, Jul. 1993.

Compteurs Schlumberger, Division Controle Industriel, Technical File, FT50–37/C, "Servo–Moteur Pneumatique Reversible, Type KW", pp. 1–8, Mai 1976 (Translation supplied).

Primary Examiner—Kevin Lee
Attorney, Agent, or Firm—Marshall, O'Toole, Gerstein, Murray & Borun

[57] ABSTRACT

A valve actuator with an instrument mounting pad and a manifold in a power module and yoke combination for mounting a valve controller instrument without tubing or mounting brackets. A cover encloses the feedback linkage between the actuator and instrument. The actuator includes a second instrument mounting pad and manifold so the power module is reversible to accommodate fail-safe opened or fail-safe closed valve conditions. A valve actuator and instrument combination is no higher than the actuator alone.

9 Claims, 6 Drawing Sheets

U.S. PATENT DOCUMENTS

| | | |
|---|---|---|
| 3,486,731 | 12/1969 | Magnani et al. . |
| 3,502,096 | 3/1970 | Clay ........................................ 137/270 |
| 3,513,059 | 5/1970 | Prohaska . |
| 3,516,442 | 6/1970 | Munroe . |
| 3,588,036 | 6/1971 | Harter . |
| 3,610,571 | 10/1971 | Cisco . |
| 3,717,322 | 2/1973 | Bernard . |
| 3,719,199 | 3/1973 | Mentink . |
| 3,719,343 | 3/1973 | Werra . |
| 3,804,364 | 4/1974 | De Lepeleire . |
| 3,814,119 | 6/1974 | Bertrand et al. . |
| 3,817,452 | 6/1974 | Dean, Jr. . |
| 3,845,783 | 11/1974 | De Lepeleire . |
| 3,945,565 | 3/1976 | Lynch et al. . |
| 3,958,592 | 5/1976 | Wells et al. . |
| 3,963,377 | 6/1976 | Elliot et al. . |
| 3,978,922 | 9/1976 | Johnson et al. . |
| 3,980,135 | 9/1976 | Garrett . |
| 3,982,558 | 9/1976 | Ochs . |
| 4,003,547 | 1/1977 | Snyder et al. . |
| 4,014,386 | 3/1977 | Johnson et al. . |
| 4,017,025 | 4/1977 | Dravnieks et al. . |
| 4,027,692 | 6/1977 | Bouteille et al. . |
| 4,111,221 | 9/1978 | Olsen . |
| 4,111,608 | 9/1978 | Elliott et al. . |
| 4,147,094 | 4/1979 | Iguchi . |
| 4,151,819 | 5/1979 | Inada et al. . |
| 4,178,938 | 12/1979 | Au . |
| 4,187,764 | 2/1980 | Cho . |
| 4,225,110 | 9/1980 | Akkerman et al. . |
| 4,240,335 | 12/1980 | Stucka et al. . |
| 4,261,546 | 4/1981 | Cory et al. . |
| 4,278,108 | 7/1981 | Casacci . |
| 4,295,630 | 10/1981 | Card et al. . |
| 4,309,022 | 1/1982 | Reinicke et al. . |
| 4,340,079 | 7/1982 | Smith et al. . |
| 4,364,414 | 12/1982 | Bouteille et al. . |
| 4,434,707 | 3/1984 | Takeuchi et al. . |
| 4,441,519 | 4/1984 | Terral . |
| 4,480,811 | 11/1984 | Card et al. . |
| 4,527,769 | 7/1985 | Stogner et al. . |
| 4,545,433 | 10/1985 | Wambaugh . |
| 4,546,953 | 10/1985 | Vinoiguerra et al. . |
| 4,569,378 | 2/1986 | Bergandy . |
| 4,572,237 | 2/1986 | Thompson . |
| 4,582,082 | 4/1986 | Tosseghini . |
| 4,604,944 | 8/1986 | Tsubouchi . |
| 4,732,189 | 3/1988 | Jones et al. . |
| 4,783,046 | 11/1988 | Young et al. . |
| 4,787,413 | 11/1988 | Saggers . |
| 4,809,733 | 3/1989 | Hawkins . |
| 4,877,058 | 10/1989 | Stoll . |
| 4,885,981 | 12/1989 | Roettger et al. ................... 137/270 X |
| 4,889,153 | 12/1989 | Zepernick et al. . |
| 4,925,498 | 5/1990 | Kemmler . |
| 4,930,555 | 6/1990 | Rudick . |
| 4,977,922 | 12/1990 | McWilliams . |
| 4,986,299 | 1/1991 | Schultz . |
| 5,007,330 | 4/1991 | Scobie et al. . |
| 5,016,856 | 5/1991 | Tartaglino . |
| 5,029,806 | 7/1991 | Huo-Lien et al. . |
| 5,069,248 | 12/1991 | Gill . |
| 5,086,801 | 2/1992 | Peacock et al. . |
| 5,101,853 | 4/1992 | Mailliet et al. . |
| 5,275,014 | 1/1994 | Solomon . |
| 5,277,397 | 1/1994 | Tartaglino . |
| 5,279,325 | 1/1994 | Kaspers . |
| 5,305,987 | 4/1994 | Baumann . |
| 5,337,797 | 8/1994 | Janssen et al. . |
| 5,348,270 | 9/1994 | Dinh . |
| 5,357,999 | 10/1994 | Loth et al. . |
| 5,370,147 | 12/1994 | Brusse et al. . |
| 5,469,774 | 11/1995 | Kaspers . |
| 5,487,527 | 1/1996 | Eggleston . |
| 5,507,467 | 4/1996 | Mott . |

FIG. 4
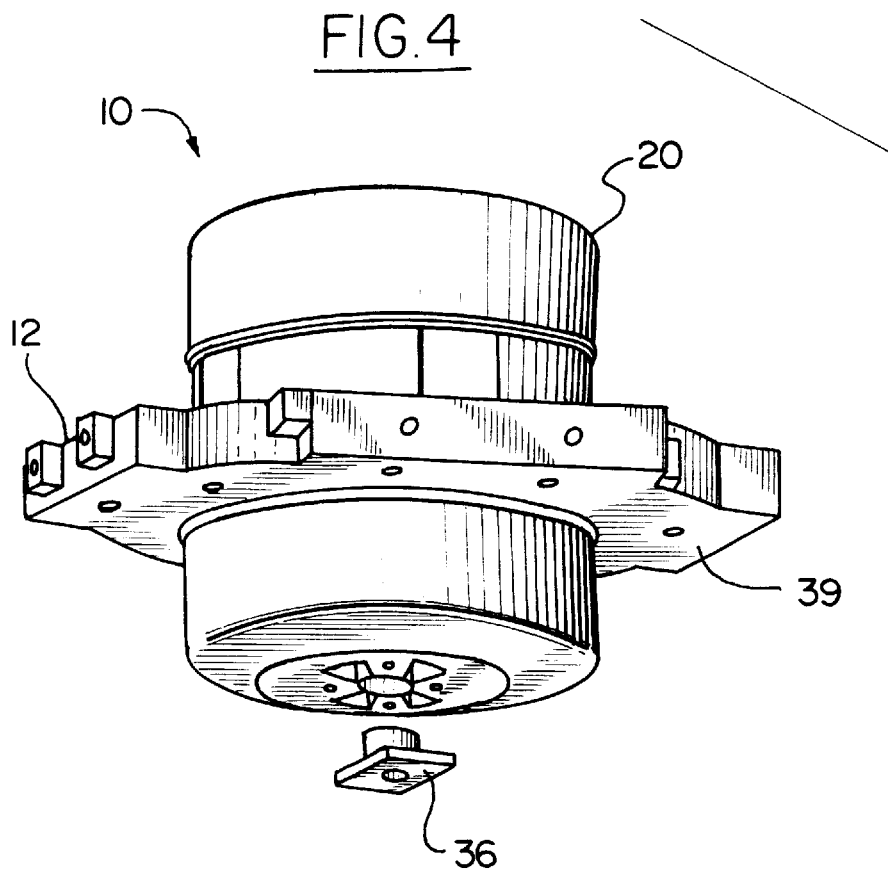
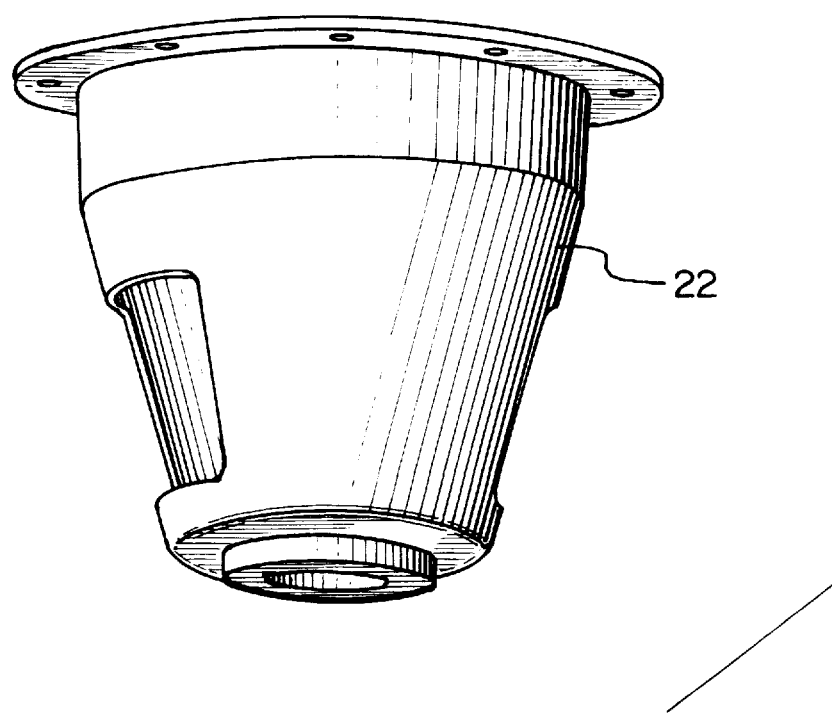

5,853,022

VALVE ACTUATOR WITH INSTRUMENT MOUNTING MANIFOLD

This invention generally relates to fluid flow control devices and in particular to actuators for fluid flow valves.

BACKGROUND OF THE INVENTION

A variety of fluid flow control valves and corresponding valve actuators are utilized for on/off control or throttling the flow of fluid, such as in a gas or oil pipeline system, or in other process fluid systems. The fluid flow control valves are typically sliding stem control valves or rotary action control valves and are operated by a valve actuator such as a pneumatic piston or diaphragm actuator responding to the output of a valve positioner or valve controller instrument for accurate throttling control of the valve.

For example, typically the fluid control valve is mounted in the pipeline system with a pneumatic actuator mounted on top of a fluid control valve and coupled to the valve fluid control element, such as a sliding stem or rotary shaft. If utilized, a valve positioner or valve controller instrument is mounted to the side of or above the actuator utilizing suitable mounting brackets and pneumatic tubing is provided between the pneumatic output of the positioner and the pneumatic input of the valve actuator. Thus, the overall valve, actuator and positioner assembly can be a fairly large and heavy combination of elements extending for some distance above the valve and projecting therefor above and to the side of pipeline and possibly greatly beyond the valve itself.

In addition, a linkage mechanism is provided between the actuator and the positioner to provide feedback information to the positioner regarding the valve open/close position. Normally, such feedback linkage includes a bracket for mounting the linkage to the actuator and a pivoting arm on the exterior of the positioner, thereby exposing the feedback linkage to the environment which in the case of normal pipeline environments or other process fluid systems environments can be extremely oily and dirty and in some cases corrosive. Also, the requirement of output tubing and mounting brackets for the actuator and positioner combination devices leads to longer installation times, higher installation costs, higher total life cycle costs, higher maintenance costs, and the requirement to manufacture and/or inventory a substantial number of new and spare parts for these devices.

Further, it is desirable to have a valve actuator which can accommodate a valve in either a fail-closed or fail-opened valve condition in the event of a loss of actuator operating pressure. In many presently available actuators, this required reversal of the actuator cannot be accomplished, or can only be accomplished with a substantial disassembly of the actuator and with the replacement of many actuator parts, i.e., effectively requiring a rebuilding of the actuator.

In all such known valve actuators presently available, there is the inability to solve all of the above-described problems. That is, in some instances, in present devices a positioner can be directly mounted to an actuator without any mounting bracket and with an enclosed feedback linkage mechanism. However, in such currently available devices, the pneumatic tubing remains exposed or the integrated positioner and actuator adds significantly to the overall height of the combined positioner, actuator and control valve. In other instances, reversing the actuator to switch from a fail-open to a fail-closed valve condition cannot be accomplished without time-consuming disassembly and reassembly with additional parts—even where the available units have eliminated pneumatic tubing and have isolated the feedback linkage mechanism from the atmosphere.

It is desired therefor to provide an actuator for fluid control valves, and in particular a combination actuator and valve controller instrument, which can meet all of the aforementioned problems and desirable features.

SUMMARY OF THE INVENTION

In accordance with the principles of the present invention, there is provided an actuator for operating a control element used to regulate the flow of fluid through a fluid control valve in response to a control valve positioning instrument, where the actuator includes a pair of coaxially aligned members, one fixed with respect to the other. A chamber is defined between adjacent ends of the members so that when the chamber is subjected to fluid under pressure the actuator operates to move the movable member between valve actuator positions. A mounting pad transversely extends outwardly from the fixed member and includes an instrument mounting surface portion beyond the movable member for mounting a control valve positioning instrument. A fluid pressure input port in the instrument mounting surface portion of the mounting pad is provided for fluid communication with the control valve positioning instrument, and fluid passageways are provided in the mounting pad and the fixed member for fluid communication between the input port and the chamber for coupling fluid under pressure from the control valve positioning instrument to the chamber during valve actuation.

The movable member and the fixed member define a power module which is selectively reversible between a first and a second position. The first position can for instance correspond to a fail-safe open valve condition wherein expansion of the chamber moves the movable member generally toward the control element. Similarly, the second position can conform to a fail-closed valve condition in which expansion of the chamber moves the movable member generally away from the control element. In this manner, when it is desired to switch from a fail-safe opened valve position to a fail-safe closed valve condition, this can be readily achieved by removing the power module from the actuator and reversing the power module to, for instance, the second position.

In a preferred embodiment of the invention, there is provided a second mounting pad transversely extending outwardly from the fixed actuator member and including a second instrument mounting surface portion beyond the movable member for mounting a control valve positioning instrument. A second fluid pressure input port is provided in the second instrument mounting surface portion, and a second fluid passageway in the second mounting pad and in the fixed actuator member provides fluid communication between the second fluid pressure input port and the chamber so as to couple fluid under pressure from a control valve positioning instrument to the chamber. This enables the first mounting pad to be used with a control valve positioning instrument in, for instance, a fail-safe open valve condition. When the actuator must operate with a desired fail-closed valve condition, the instrument is removed from the mounting pad, the power module is removed from the actuator, and reversed in position so that the control valve positioning instrument is mounted to the second instrument mounting surface portion with the instrument fluid pressure output communicating with the second fluid pressure input port. The preferred embodiment further includes a bladder mounted in the chamber with the bladder inlet fluidly coupled to the fluid passageways in the mounting pad and the fixed member.

The preferred embodiment further includes a fixed internal member and a movable external member axially movable with respect to the fixed internal member. Subjecting the bladder to an input fluid pressure from the control valve positioning instrument operates the actuator and moves the movable external member away from the fixed internal member from a first valve actuator position to a second valve actuator position and against the opposing forces of a return spring. When the operating fluid pressure is removed from the bladder, the return spring can move the movable exterior member axially away from the second valve actuator position to the first valve actuator position.

A combined valve controller instrument and valve actuator is provided with a valve controller instrument mounted to the instrument mounting portion and having a fluid pressure outlet coupled to the fluid pressure input port on the mounting pad. A feedback linkage mechanism is mounted intermediate the actuator and the instrument, and a cover is removably mounted on the actuator so as to cover the feedback linkage to protect the linkage from the environment. The mounting pad is provided substantially midway between opposite ends of the reversible power module so that in either position of the selectively reversible power module the mounted control valve positioning instrument on the mounting pad does not project the instrument beyond the height of the capped actuator.

The improved actuator of the present invention includes a power module assembly with an internally manifolded instrument mounting pad, a yoke, and a cover so as to accommodate a valve position controller mounted at the power module mounting pad. This eliminates output tubing and mounting brackets, and without any exposed linkages. Furthermore, the sealed reversible power module provides either spring-fail closed or spring-fail open action to the control valve by simply reorienting the power module on the actuator yoke.

The significant advantages unique to the present actuator and combination actuator and control valve positioning instrument are as follows:

(A) Actuator action (spring-fail up or spring-fail down) can be reversed with minimal disassembly and no additional parts. Actuator reversal involves removing the positioner mounting screws, the stem connection screws and feedback linkage, inverting the power module of the actuator, and reattaching the positioner. Positioner removal/reattachment involves loosening and reinstalling threaded screws with no laborious disconnection and reinstallation of pneumatic tubing between the positioner and the actuator, no rerouting of pneumatic supply tubing or signal tubing or conduit to a different positioner location, or reorientation of mounting brackets;

(B) Positioner integration does not add to the overall height of the actuator. Height is not added to the actuator to accommodate positioner mounting or to allow space for the position feedback linkage mechanism;

(C) Positioner/instrument can be removed and replaced with an identical unit with minimal disassembly that does not involve pneumatic tubing between the positioner and the actuator;

(D) Positioner/instrument can be upgraded to a device with greater capability by simply unbolting the initial instrument and replacing it with another instrument having the same mounting manifold configuration; and (E) Access to the feedback linkage system components is much simpler in that there is less disassembly and greater accessibility afforded than with presently available integrated actuator/instrument assemblies.

Accordingly, the significant benefits derived from these features are the significant savings in cost and assembly time and the lessening of susceptibility to damage to the actuator and/or instrument. Furthermore, providing a manifolded mounting pad on the actuator power module offers the opportunity to add auxiliary items, such as for example, a solenoid fail-safe system which does not require output tubing from a solenoid to the actuator, a pressure booster, or a relay, etc.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 4 is an exploded view illustrating the actuator of the present invention with a reversible power module and yoke components;

DETAILED DESCRIPTION

Figure 1:
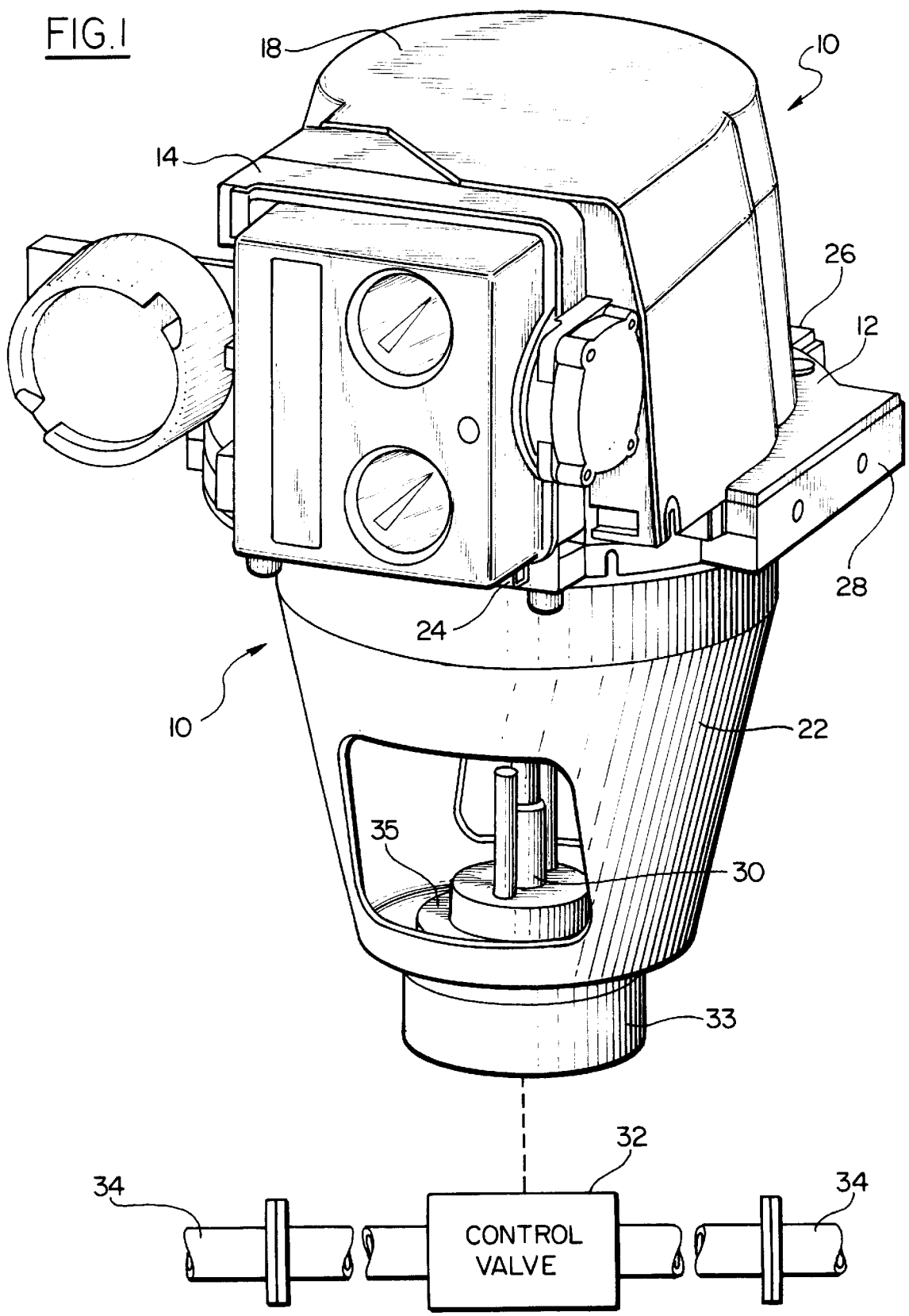
FIG. 1 is a perspective view illustrating a valve actuator and control valve positioning instrument combination in accordance with the principles of the present invention.
Figure 2:
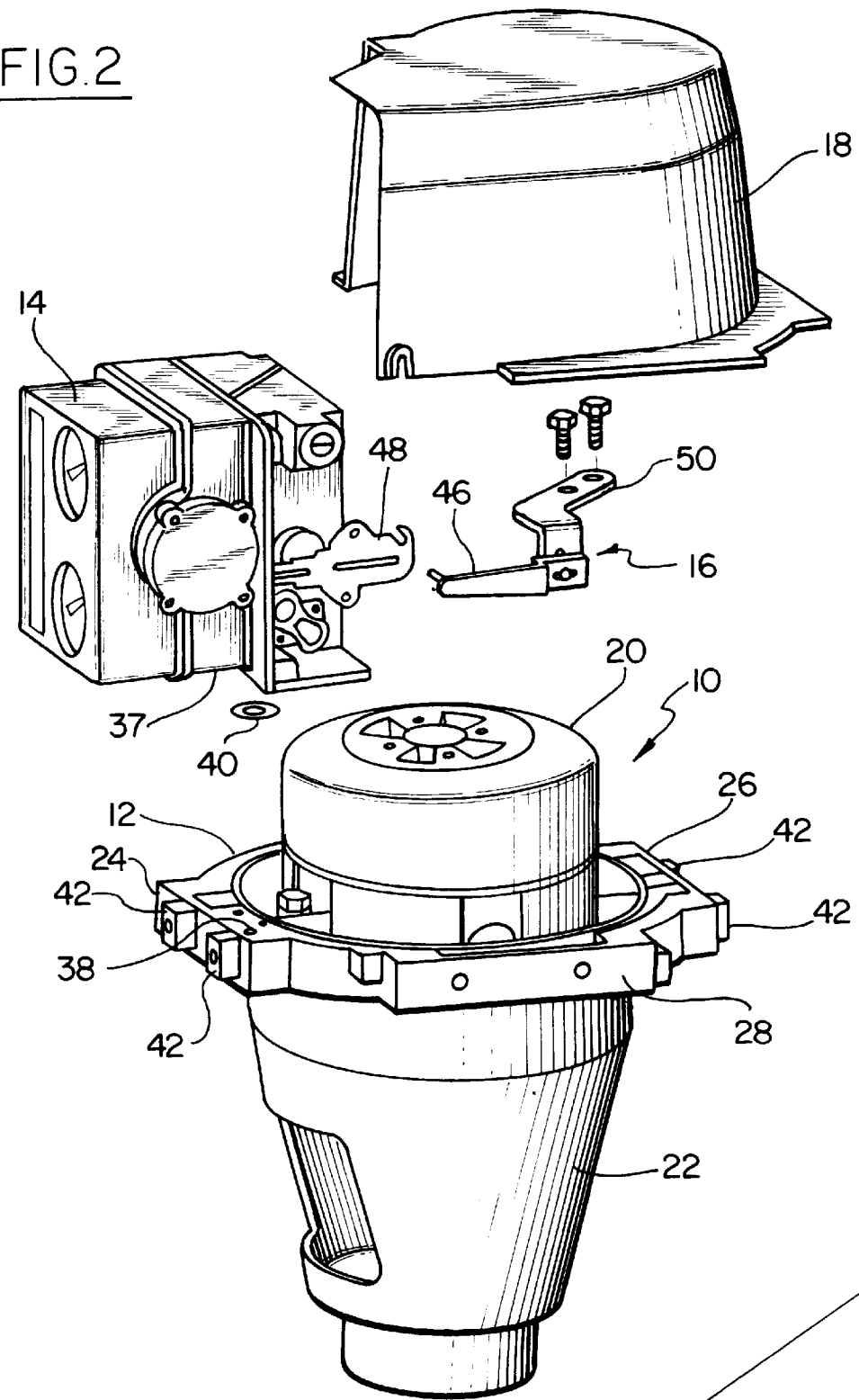
FIG. 2 is an exploded view illustrating a valve actuator, a valve positioning instrument, feedback linkage mechanism, and a cover with respect to the combined unit of FIG. 1.
Figure 3:
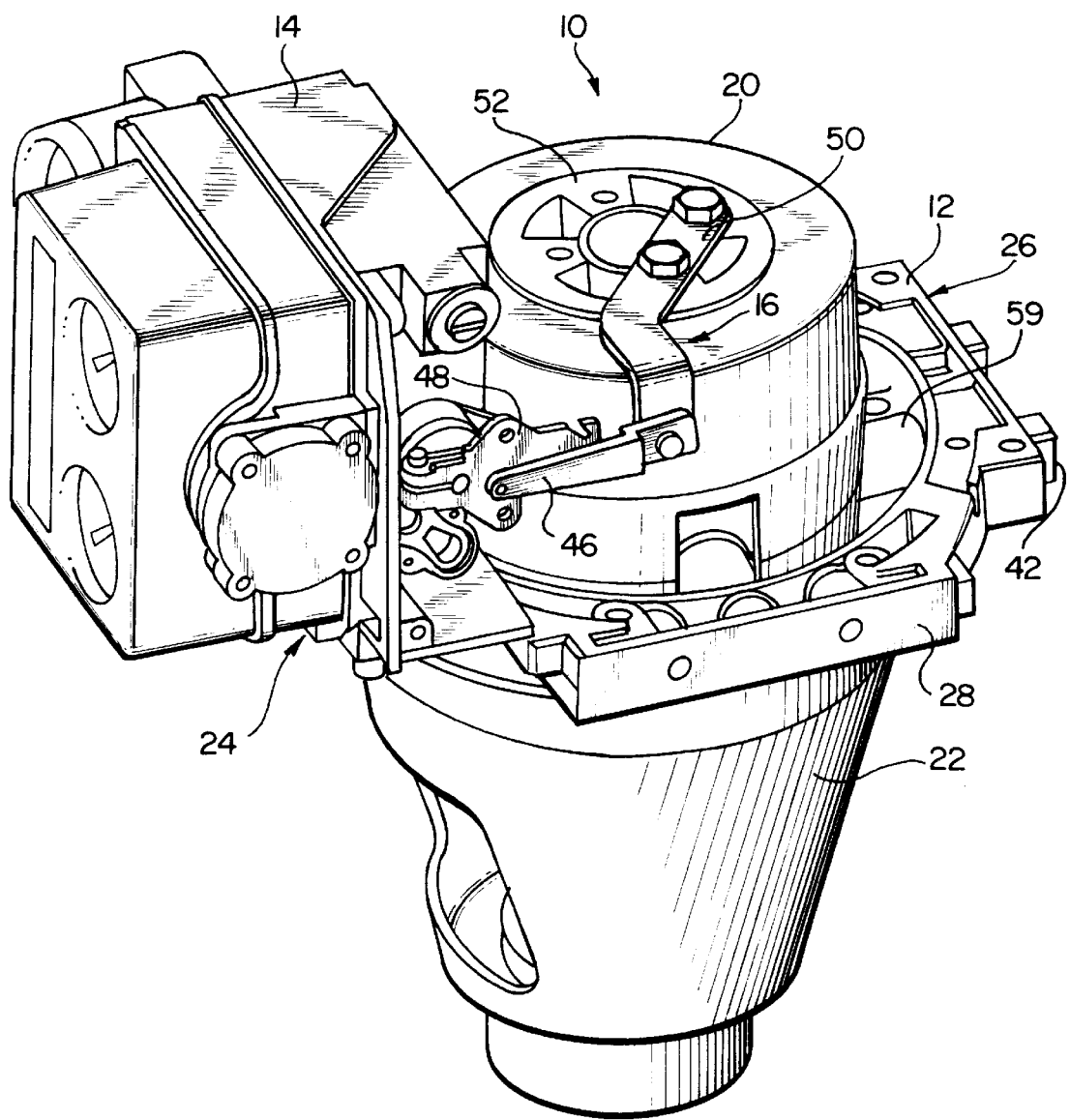
FIG. 3 is a perspective view illustrating the actuator of FIG. 1 with mounting pads for mounting a control valve positioning instrument.

Referring initially to FIGS. 1–3, there is illustrated a valve actuator 10 in accordance with the principles of the present invention as including a mounting pad 12 in the form of a ring for mounting of a valve positioner instrument 14. A feedback linkage mechanism 16 interconnects the actuator 10 and the valve positioner instrument 14. A cover 18 is provided for removable mounting on the actuator 10 so that as shown in FIG. 1, the cover 18 completely covers the feedback linkage 16. Also it may be noted from FIG. 1 that the mounting of the valve positioner instrument 14 on the mounting pad 12 does not extend the height of the actuator 10 beyond the cover 18.

Figure 5:
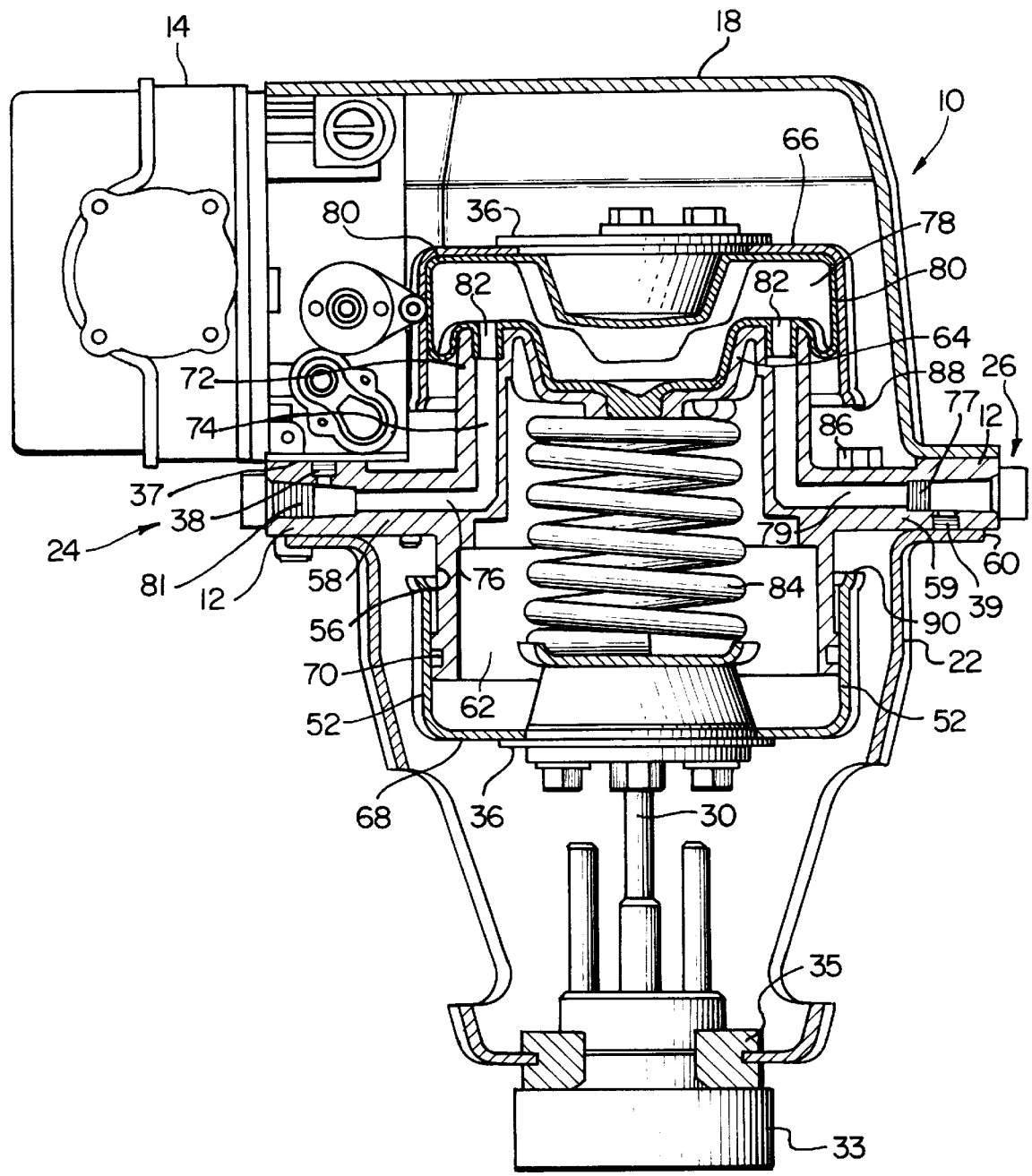
FIG. 5 is an elevational view partly in section illustrating the actuator of FIG. 1 with the power module in a first installed position.
Figure 6:
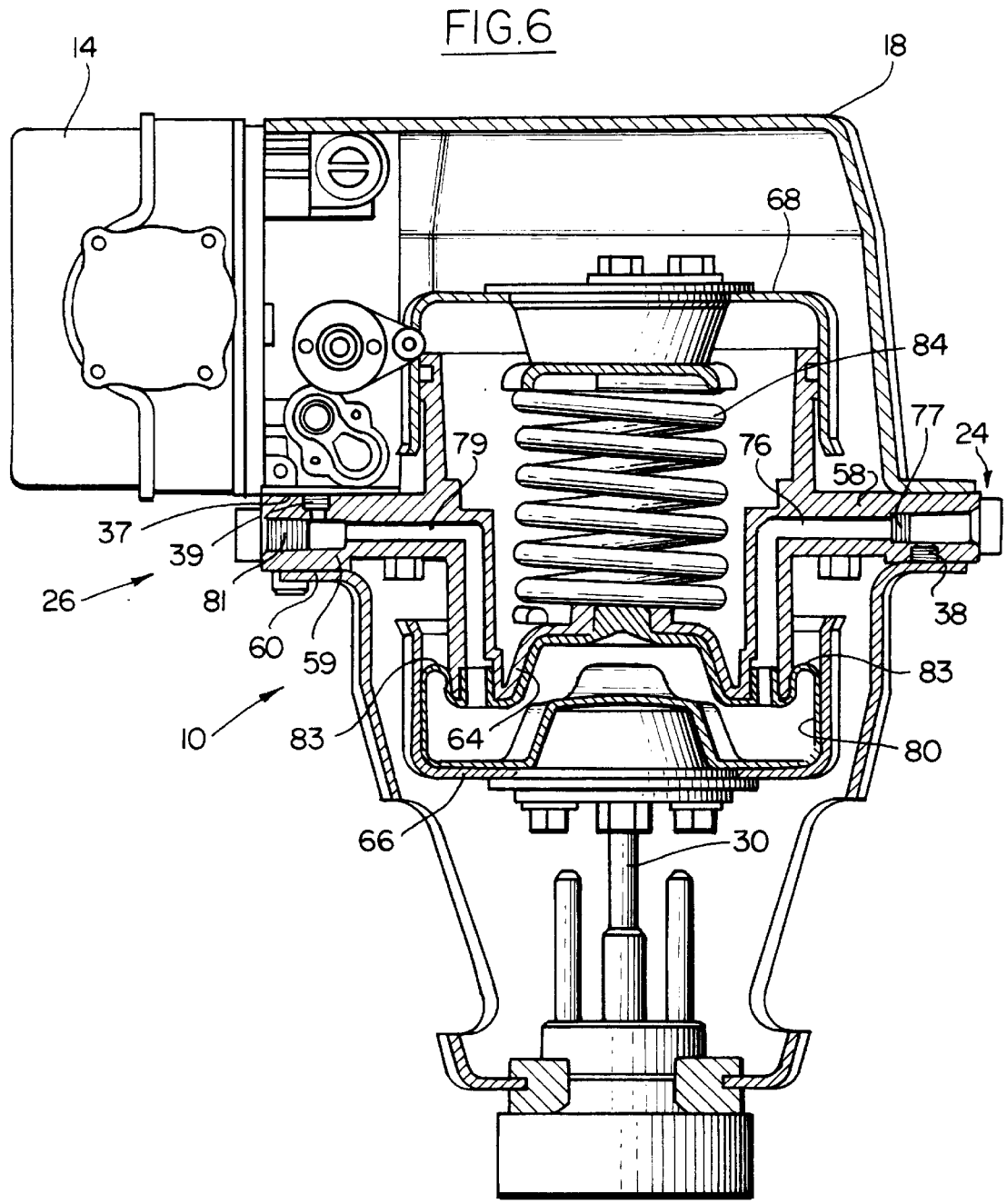
FIG. 6 is an elevational view partly in section illustrating the actuator of FIG. 1 with the power module reversed to a second position.

The actuator 10 includes a power module assembly 20 which is mounted by threaded screws to a yoke 22. The mounting pad 12 projects outwardly from the power module 20 as shown in FIGS. 2 and 3 and includes respective instrument mounting positions 24, 26 for mounting a valve controller instrument such as the valve positioning instrument 14 utilizing threaded bolts. Two instrument mounting positions are provided so that the actuator can accommodate either a fail-open or a fail-closed valve condition as will be more particularly described hereinafter in connection with reversing of the position of the power module 20 as shown in FIGS. 5 and 6. If desired, a third mounting position 28 on the mounting pad 24 is provided (and a fourth mounting position opposite to position 28 is also provided) for adding auxiliary items as set forth above.

In FIG. 1, the valve actuator 10 is illustrated as coupled to a mechanical control element 30 for controlling for instance a fluid control valve 32, such as a sliding stem valve mounted in a pipeline 34. A stem connector 36 (see FIG. 4) is used to interconnect the valve stem or control element 30 to the movable element within the actuator power module 20. The combined actuator and instrument mounts to a valve bonnet 33 of the control valve 32, with the actuator yoke 22 held in place by a suitable lock nut threadably engaged on the bonnet 33 and threaded until locking against a yoke bottom flange 35.

The valve positioning instrument 14 can be a digital valve controller, such as a communicating, microprocessor-based current to pneumatic instrument. In addition to the normal function of converting an input current signal to a pneumatic output pressure, the digital valve controller, using a communications protocol, can provide easy access to information critical to process operation. Thus, one can gain information from the principle component of the process, i.e. the control valve 32, using a compatible communicating device at the control valve or at a field junction box, or by using a personal computer or operator's console within a control room. Alternatively, the instrument can be an analog device or a pneumatic positioner.

As can be seen from the overall view of FIGS. 1–3, the actuator as illustrated in more detail in FIGS. 4–6 provides several desired features not available in presently commercially available units, i.e.: (1) a sealed reversible power module providing either fail-opened or fail-closed action to the control valve; (2) the elimination of mounting brackets; (3) the elimination of external tubing; (4) the elimination of any fittings usually required between the instrument and the actuator; and (5) the protection of the feedback linkage from the environment. Also, a positioner bleed vent is provided under the cover 18 which enables existing air in the chamber surrounded by the cover to be purged from the chamber with clean air from the bleed vent.

In particular, a pneumatic output port 37 on the valve positioner 14 is mounted in line with an input port 38 on the mounting pad 12 at the instrument mounting position 24 with an O-ring 40 therebetween. The positioner 14 is then securely mounted on the mounting pad 12 at the mounting position 24 by suitable threaded means such as a pair of cap screws. Another input port 39 is provided on the mounting pad 12 at the instrument mounting position 26. Additional mounting bosses 42 are provided as auxiliary mounts for a filter regulator, or other instruments, or auxiliary items.

The feedback linkage 16 includes one end 46 engaging a pivoting bracket 48 on the positioner 14, whereas another feedback linkage end 50 is securely mounted to an actuator movable member 52. Because the actuator movable member 52 is interconnected with the valve stem or control element 30, the position of the valve stem is sensed by the positioner 14 through the feedback linkage mechanism 16.

Referring now to FIGS. 4–6, there is illustrated the further details of a valve actuator having a mounting pad to provide a mounting position to form a combined valve actuator and integrated valve controller instrument. The power module 20 includes a stationary inner member 56 with lateral extensions 58, 59 integrally formed with the ring-shaped mounting pad 12, which mounting pad includes the previously described respective instrument mounting positions 24, 26 as well as the auxiliary mounting position 28 (and opposite mounting position not illustrated). The mounting pad 12 is assembled on a mounting flange 60 of the yoke 22 and is mounted to the yoke flange by means of a series of suitable cap screws.

The stationary inner member 56 of the power module 20 is in the form of a stationary piston with an open bottom end 62 as shown in FIG. 5 and an opposite closed end provided by an end wall 64. The power module 20 also includes the movable outer member 52 in the form of a cylindrical canister axially aligned with and surrounding the stationary inner member 56. A cavity/dome-shaped cap 66 forms one end of the movable outer member 52, and an identical dome-shaped end wall 68 at the bottom of the movable member 52 forms the opposite end wall of the movable outer member. A respective stem connector plate 36 is welded to the cap 66 and to the cap 68, with each of the stem connector plates 36 including a central aperture for receiving the valve stem 30. It can be seen therefore that the power module 20 is symmetrically shaped and is reversible by simply removing the cap screws attaching the mounting pad 12 to the yoke mounting flange 60 and then inverting the power module so that as shown in FIG. 6 the cap 66 is on the bottom and the cap 68 is on the top in the reverse of the power module position as seen from FIG. 5.

A guide ring 70 is suitably mounted at the bottom of the stationary inner member 56 (see FIG. 5) and in sliding engagement against the inner surface of the movable outer member 52 to assist in guiding slidable movement of the movable outer member 52 axially on the stationary inner member 56. The stationary inner member 56 includes an inner member wall 72 which includes a passageway 74 which communicates with the input port 38, at the mounting pad 12 through a connecting passageway 76 in the lateral extension 58 extending from the end wall 72. Similar manifold passageways through the actuator are provided on opposite sides of the power module 20 and through respective opposite lateral extensions 58, 59 as shown in FIG. 5, leading to the respective input ports 38, 39. In FIG. 5, a small plug 77 is threadably inserted into the passageway 79 when instrument 14 is mounted at mounting position 24, and a larger plug 81 is threadably inserted into passageway 76.

Within a chamber 78 defined between the stationary inner member end wall 64 and the movable outer member end wall 66, there is provided a sealed, formed bladder 80 having respective inlets 82 coupled to respective ends of the passageways 74. This permits fluid communication between the pneumatic output port 37 of the valve controller instrument 14 coupled to the input port 38 and through passageways 76, 74 to enter the chamber 78 defined within the bladder 80.

The top of bladder 80 in FIG. 5 is formed to conform to the end wall 66 of movable member 52 and the bottom of the bladder is formed to conform to the end wall 64 of stationary member 56. A peripheral bladder portion 83 provides a rolling diaphragm action to move the movable member 52 in response to pressurizing fluid through bladder inlet 82.

A spring 84 is mounted within the stationary inner member and between the respective end walls of the actuator members, i.e. between end wall 64 of the stationary inner member and the cap 68 of the movable outer member. A pair of opposite adjustable stops are provided by respective threaded bolts 86 each threadably engaging a respective lateral extension 58, 59 with suitable lock nuts to aid in maintaining the position of the adjustable stops. Thus, the movable outer member 56 can move downwardly in FIG. 5 until the ledge 88 butts against the threaded bolt 86, and the movable outer member 52 can move upwardly until a ledge 90 butts against the threaded bolt 86.

In the operation of the actuator 10, fluid under pressure, such as pneumatic pressure supplied by the valve controller instrument 14 to input port 38 is coupled through passageways 76, 74 into chamber 78 within the bladder 80 which expands the bladder and in a rolling diaphragm action forces the movable outer member 52 to move upwardly in FIG. 5 so as to carry with it the attached mechanical control element 30 which could be a valve stem or motion conversion linkage if used with a rotary shaft valve. In any event, the driven movement of movable outer member 52 compresses spring 84 so that the movable outer member has been moved in an upward direction, with respect to the stationary inner member 56. In a single acting configuration, the input port at instrument mounting position 26 would be closed with plug 77. Relieving the pressure within the bladder 80 through the action of the valve controller instrument 14 allows the compressed spring 84 to push the movable outer member 52 downwardly in the configuration shown in FIG. 5.

Initially, in mounting the valve actuator 10 to the fluid control valve, it must be decided whether a fail-closed or a fail-opened condition of the valve is desired in the event there is a loss of actuator operating pressure. In the illustration of FIG. 5, the actuator is configured to operate with a valve in the fail-closed position since it can be seen that if there is no operating pressure supplied to input port 38 from the valve controller instrument 14, the spring 84 maintains the movable outer member 52 in a full indicated down position which will normally close the associated fluid control valve.

If it was required that the valve be placed in a fail-open situation, then the power module 20 simply needs to be reversed in position. If the instrument 14 is in mounting position 24, it must first be removed. Power module reversal can be readily accomplished by removing the cap screws mounted between the mounting pad 12 and the yoke flange 60, and reversing and positioning the power module 20 to the position shown in FIG. 6. Accordingly, as shown in FIG. 5, the bladder 80 is at the top of FIG. 5, and when the power module 20 is removed from the yoke 22 (see FIG. 4) and reversed and reinserted and positionally remounted into the yoke 22, the bladder 80 is at the bottom as shown in FIG. 6. Note that the actuator 20 has been positioned so that input port 39 is now communicating with instrument output port 37. The small plug 77 is inserted into passageway 76 and the large plug 81 is inserted into the passageway 79.

With the power module 20 so reversed, the movable outer member 52 will initially be in the up position (see FIG. 6) under the action of the spring 84 so the valve will be opened, and applying input pressure to the input port will move the movable outer member 52 in the downward direction tending to close the valve. Thus, the valve actuator position of FIG. 6 provides a fail-open situation because if there is a loss of actuator operating pressure, the spring 84 will return the movable outer member 52 to the upward position of FIG. 6 which will normally open the associated fluid control valve.

Accordingly, the present invention not only accommodates a combined valve actuator and valve controller instrument, but also provides a reversible power module in such a combination which can provide either a spring-fail closed or a spring-fail opened action to the control valve without replacing components or reconstructing the actuator as in presently available units.

The foregoing detailed description has been given for clearness of understanding only, and no unnecessary limitations should be understood therefrom, as modifications will be obvious to those skilled in the art.

It is claimed:

1. In an actuator for operating a control element used to regulate the flow of fluid through a fluid control valve in response to a control valve positioning instrument, said actuator including a pair of coaxially aligned members, one movable external member of said pair externally mounted with respect to a fixed internal member of said pair and axially movable with respect to the fixed internal member, said members having adjacent ends, wherein a chamber is defined between said adjacent ends for moving said one movable external member away from said fixed internal member during operation of said actuator, means for coupling said control element to said movable external member, and wherein said chamber when subjected to fluid under pressure operates said actuator and moves said movable external member away from said fixed internal member from a first valve actuator position to a second valve actuator position, the improvement comprising:

a mounting pad transversely extending outwardly from said fixed internal member and including an instrument mounting surface portion beyond said movable external member for mounting said control valve positioning instrument;

a fluid pressure input port in said instrument mounting surface portion for fluid communication with said control valve positioning instrument; and fluid passageways in said mounting pad and said fixed internal member for fluid communication of said fluid pressure input port and said chamber for coupling fluid under pressure from said control valve positioning instrument to said chamber; including a bladder mounted in said chamber, said bladder defining an interior space for receiving fluid, and means for fluidly interconnecting said fluid passageways with said interior space.

2. An actuator according to claim 1, wherein said movable external member and said fixed internal member define a power module;

said power module is selectively reversible between a first position and a second position;

said first position being a position in which expansion of said chamber moves said movable external member generally toward said control element; and said second position being a position in which expansion of said chamber moves said movable external member generally away from said control element.

3. An actuator according to claim 2, including a second mounting pad transversely extending outwardly from said fixed internal member and including a second instrument mounting surface portion beyond said movable exterior member for mounting said control valve positioning instrument, and further including, a second fluid pressure input port in said second instrument mounting surface portion, and a second fluid passageway in said second mounting pad and said fixed internal member for fluid communication of said second fluid pressure input port and said chamber for coupling fluid under pressure from said control valve positioning instrument to said chamber.

4. An actuator according to claim 3, wherein said bladder includes means for fluidly communicating said second fluid passageway with said bladder interior space.

5. A combined fluid valve and valve actuator apparatus for regulating the flow of fluid in response to a control valve positioning instrument, said combined valve and valve actuator apparatus comprising:

a fluid control valve including a flow control element for controlling the flow of fluid through a pipeline;

a valve actuator including,
- (a) a stationary inner member mounted to said fluid control valve;
- (b) a movable outer member coaxially aligned with and movably mounted axially on said stationary inner member, said movable outer member and said stationary inner member having adjacent ends, wherein a chamber is defined between said adjacent ends;
- (c) means for coupling said movable outer member to said flow control element;
- (d) means for coupling said chamber to an actuator fluid pressure source for moving said movable outer member axially on said stationary inner member from a first valve actuator position to a second valve actuator position to correspondingly control the flow of fluid through said fluid valve; and
- (e) return means for moving said movable outer member axially from said second valve actuator position to said first valve actuator position;

a mounting pad transversely extending outwardly from said stationary inner member and including an instrument mounting surface portion beyond said movable outer member for mounting said control valve positioning instrument having a fluid pressure outlet;

a fluid pressure input port in said instrument surface mounting portion for fluid communication with said control valve positioning instrument, said control valve positioning instrument fluid pressure outlet mountable immediately adjacent said fluid pressure input port; and fluid passageways in said mounting pad and said stationary inner member for fluid communication of said fluid pressure input port and said chamber for directly coupling fluid under pressure from said control valve positioning instrument fluid pressure outlet to said fluid pressure input port to said chamber.

6. A combined valve controller instrument and valve actuator apparatus for operating a flow control element used to regulate the flow of fluid through a fluid control valve in response to said valve controller instrument, said combined valve controller instrument and valve actuator apparatus comprising:

a valve actuator including,
- (a) a stationary inner member mounted to said fluid control valve;
- (b) a movable outer member coaxially aligned with and movably mounted axially on said stationary inner member, said movable outer member and said stationary inner member having adjacent ends, wherein a chamber is defined between said adjacent ends;
- (c) means for coupling said movable outer member to said flow control element;
- (d) means for coupling said chamber to an actuator fluid pressure source for moving said movable outer member axially on said stationary inner member from a first valve actuator position to a second valve actuator position to correspondingly control the flow of fluid through said fluid valve; and
- (e) return means for moving said movable outer member axially from said second valve actuator position to said first valve actuator position;

a mounting pad transversely extending outwardly from said stationary inner member and including an instrument mounting surface portion beyond said movable outer member for mounting said valve controller instrument having a fluid pressure outlet;

a fluid pressure input port in said instrument surface mounting portion for fluid communication with said valve controller instrument, said control valve positioning instrument fluid pressure outlet mountable immediately adjacent said fluid pressure input port;

fluid passageways in said mounting pad and said stationary inner member for fluid communication of said fluid pressure input port and said chamber for directly coupling fluid under pressure from said valve controller instrument fluid pressure outlet to said fluid pressure input port to said chamber; and a valve controller instrument mounted to said instrument surface mounting portion and having a fluid pressure outlet directly coupled to said fluid pressure input port.

7. A combined actuator and instrument according to claim 6, including a feedback linkage mounted intermediate said actuator and said instrument, and a cover removably mounted on said actuator and covering said feedback linkage for protecting said feedback linkage from the environment.

8. A combined actuator and instrument according to claim 6, wherein said movable outer member and said stationary inner member define a power module;

said power module is selectively reversible between a first position and a second position;

said first position being a position in which expansion of said chamber moves said movable outer member generally toward said control element; and said second position being a position in which expansion of said chamber moves said movable outer member generally away from said control element.

9. A combined actuator and instrument according to claim 6, including a fluid control valve mounted to said stationary inner member and including a flow control element mounted to said movable outer member.

* * * * *